Dec. 6, 1927.
W. P. CASEY
1,651,995
ELECTRIC HAND SAW
Filed Oct. 11. 1924     3 Sheets-Sheet 1
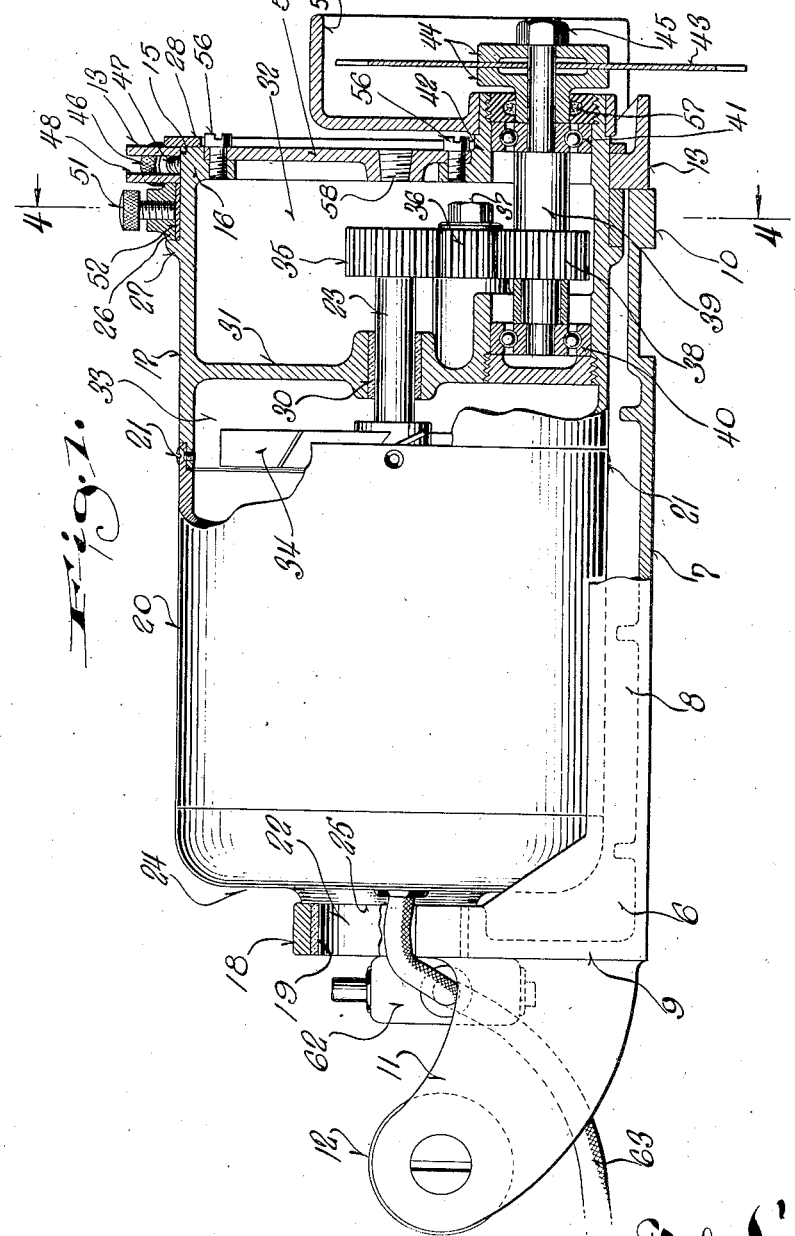
Inventor
William P. Casey
By Ira M. Jones.
Attorney.

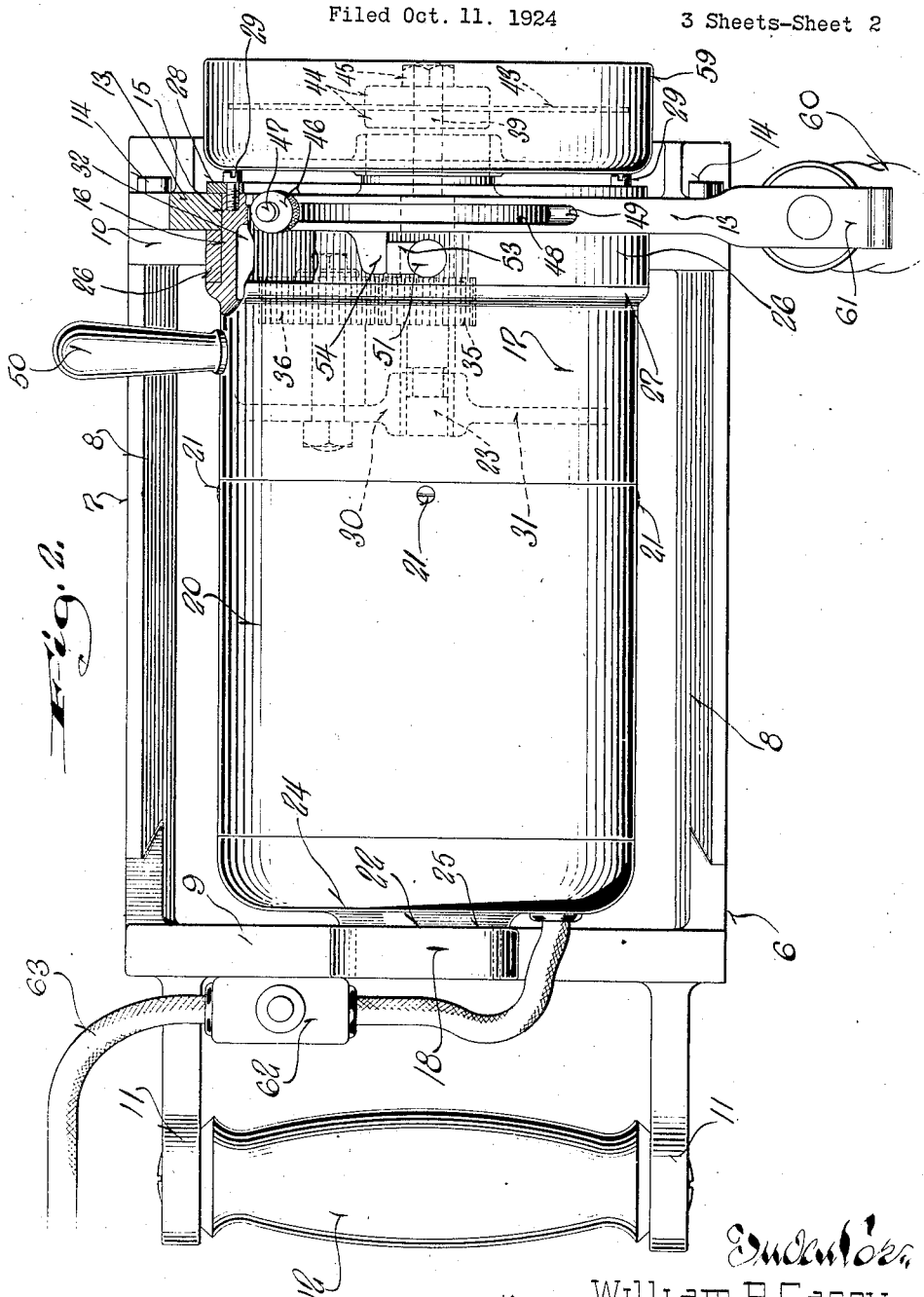

Dec. 6, 1927.
W. P. CASEY
ELECTRIC HAND SAW
Filed Oct. 11. 1924
1,651,995
3 Sheets-Sheet 3
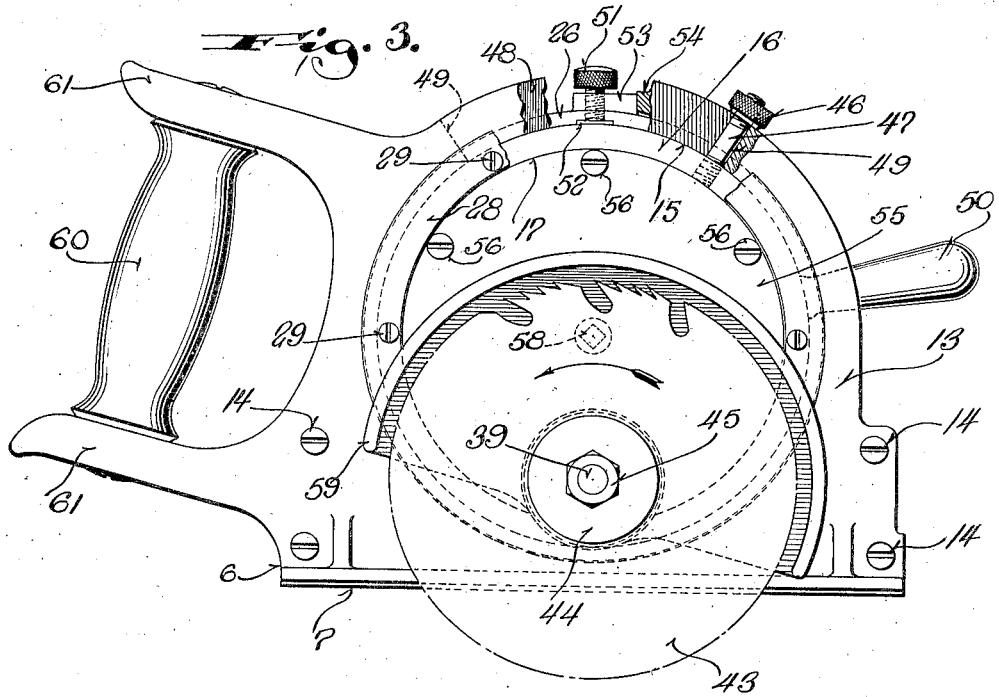
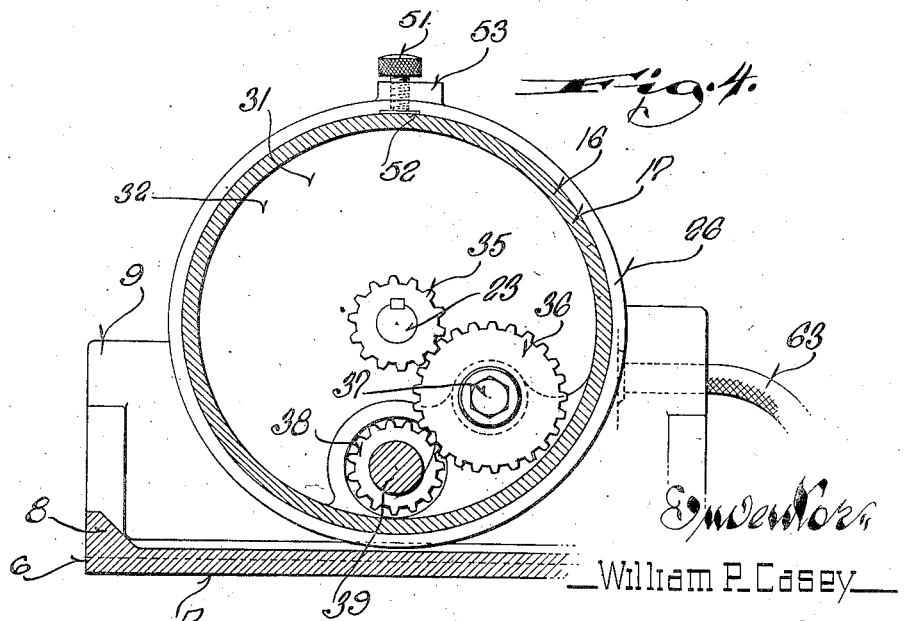
William P. Casey Patented Dec. 6, 1927.

1,651,995

UNITED STATES PATENT OFFICE.

WILLIAM P. CASEY, OF OSHKOSH, WISCONSIN.

ELECTRIC HAND SAW.

Application filed October 11, 1924. Serial No. 743,027.

This invention relates to certain new and useful improvements in electric hand saws of that type which is readily portable and capable of general use in the wood working and kindred arts.

It is one of the objects of this invention to provide a compact, unitary, electric hand saw with which various types of cutters may be employed to permit its use for various types of work.

Another object of this invention resides in the provision of a hand saw of the character described, the structure of which affords a strong and durable machine and which is light in weight and well balanced to permit its easy handling by the operator and which is designed for its convenient manufacture without in any manner interfering with its efficient operation.

This invention has as a further object the provision of improved means for effecting the ready adjustment of the depth of cut, which means has simple means for limiting its movement.

And a still further object of this invention resides in the provision of an electric hand saw of the character described which has its arbor carrying member and gear housing made a substantial part of the motor and the parts of which are so arranged as to facilitate their convenient and easy replacement.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a side view of an electric hand saw embodying my invention, parts thereof being broken away and in section to more clearly illustrate details of construction;

Figure 2 is a top view thereof, parts thereof being broken away and in section;

Figure 3 is an elevational view looking at the cutting end or side of the saw, parts being broken away and in section, and Figure 4 is a fragmentary view taken through Figure 1 on the plane of the line 4—4.

Referring now more particularly to the accompanying drawings, in which like numerals designate like parts throughout the several views; the numeral 6 designates a supporting frame structure, which may be of any desired shape but is illustrated in the drawings as of substantially rectangular form having a straight work engaging surface 7 and includes side members 8 connected at their ends by transverse members 9 and 10.

Extended outwardly from the transverse member 9, substantially parallel with the members 8, are a pair of spaced arms 11 the outer ends of which are connected by a hand grip 12 and secured to the end of the frame 6 formed by the transverse member 10 is a standard or guide 13. The standard 13 is removably secured to the frame by cap screws 14 and extends thereabove and is vertically bored, as at 15, to rotatably mount the outer portion 16 of a gear housing or casing 17.

A bearing 18 is carried by the transverse member 9 with its bore 19 in axial alignment wth the bore of standard 13. The gear housng 17 forms a continuation of the motor housing 20 to which it is detachably secured, as at 21, the motor housing mounting a drive motor (not shown) and having a bearing boss 22, in which its armature or drive shaft 23 is journaled, extended from its rear wall 24 which is journaled in the bearing 18. In this manner the motor 20 and the drum housing 17 are rotatably mounted in the frame, being supported at one end by the motor boss 22 and at the other end by the outer portion 16 of the gear housing.

The motor and drum housings are secured against longitudinal movement in the frame by the shoulder 25 of the boss 22 engaging against the inner face of the bearing 18 and by an adjusting ring 26, to be later explained, which is fitted over the end 16 of the drum housing and is confined between an annular bead 27 thereon and the standard 13. If desired a ring or flange 28 may be secured to the outer end of the drum 17 which overlies the outer face of the standard 13 as best illustrated in Figures 1 and 2. The ring 28 is detachably secured in place by cap screws or other means 29.

The motor 20 may be of any desired construction and its armature or drive shaft 23 extends into the interior of the housing 17 and is journaled in a bearing 30 formed in a partition wall 31 which divides the housing into a gear chamber 32 and a compartment 33 in which a cooling fan 34 for the motor may be positioned. Fixed on the end of the motor shaft 23 in the gear chamber 32 is a drive pinion or gear 35 which meshes with an intermediate or idling gear 36 mounted on a stub shaft 37 extended from the partition wall 31 and meshing with a pinion 38 which is mounted on a tool arbor 39. The inner end of the arbor 39 is journaled in a bearing 40 carried by the partition wall 31 and the outer end thereof passes through a bearing 41, carried by an enlargement or boss 42 formed in the outer portion of the drum member, and extends therebeyond to receive a cutting saw 43. The cutting saw 43 is removably secured on the extended end of the arbor by suitable clamping plates 44 and a lock nut 45.

The tool arbor 39 is offset with respect to the axis of the drum 17 and, consequently, affords means for adjusting the depth of cut of the saw 43. The adjustment of the saw is obtained by rotating the drum member which is readily secured in adjustable position by a clamping nut 46 threaded on a screw or stud 47 carried by that portion of the drum member journaled in the standard. The stud projects through a slot 48 in the standard, the ends 49 of which provide means for limiting the rotation of the drum member and consequently the maximum depth of cut of the saw. For convenience in adjusting a handle 50 extends from the drum member and when it is desired to regulate the depth of cut, the binding nut 46 is unscrewed sufficient to disengage the standard 13 and the motor and drum casing rotated the desired degree by the handle 50 when the binding nut 46 is tightened to bind against the standard and thus secure the saw in adjusted position.

In order to facilitate the adjustment of the depth of cut, the adjusting ring 26, previously referred to, is rotatable on the gear casing, but held against longitudinal movement thereon by the standard 13 and bead 27, and is securable against rotation on the housing by a binding screw 51 threaded therein with its inner end engageable against a friction plate 52, as best shown in Figure 1. The ring 26 has thereon a projection 53 which lies within the path of a projection or lug 54 extended over the ring from the standard 13, adjustment being attained by loosening the binding screw 51; setting the ring to position its lug 53 from the lug 54 the distance equal to the depth it is desired to cut; making ring 26 fast to the drum member by the binding screw; loosening binding nut 46; rotating the drum member by the handle 50 to abut the lugs 53 and 54, and then tightening the nut 46.

The gears in the drum housing may run in oil if desired and preferably roller bearings are provided for the arbor shaft and the driving gears to reduce friction to a minimum. The lubricant for the gears and arbor shaft bearings is prevented from leaking from the drum, by a plate 55 which is removably secured in place closing its outer end by fastening means 56 and a packing 57 surrounding the arbor shaft at its point of egress from the boss 42. Lubricant is supplied the gear and shaft bearings through a plugged opening 58 located preferably in the center of the plate 55. The boss 42 is preferably integral with the drum member and the plate is formed to have a tight fit therewith, the boss projecting beyond the plate to mount a saw guard 59.

The improved saw illustrated in the drawings may be used in connection with various riggings but the most accessible use is that wherein its base is guided over the work. In order that the tool may be properly balanced for handling whether it be guided over a flat surface or used by the operator for overhead work, such as trimming frames, etc., the handle 12 is gripped by the left hand of the operator and a second handle 60 gripped by the right hand. The handle 60 lies in a substantially vertical plane being slightly inclined and is confined between two spaced, substantially parallel lugs or arms 61 formed on the standard 13 and the handle 12 normally lies substantially horizontal. This arrangement permits the easy handling of the tool with a minimum of effort on the part of the operator.

The motor is controlled without the necessity of moving the hands from the handles by a switch 62 interposed in the feed lines 63 and secured to the end member 9 within reach of the operator's thumb or index finger of his hand gripping the handle 12.

From the foregoing description taken in connection with the accompanying drawings it will be readily obvious to those skilled in the art to which an invention of this character appertains, that I provide a well balanced and efficient portable saw device which may be used in connection with various types of work and which will permit fast and efficient work.

What I claim as my invention is:

1. In a tool of the character described, a frame member, a motor having a protecting housing, a gear housing forming a continuation of the motor housing, means rotatably mounting the motor and gear housings in the frame member, a tool arbor journaled in the gear housing to one side of the center thereof whereby rotation of the motor and gear housings in the frame member adjusts the tool arbor, a drive connection between the tool arbor and motor, and means releasably securing the motor and gear housings in the frame member against rotation.

2. In a tool of the character described, a frame member, a motor having a protecting housing, a gear housing forming a continuation of the motor housing, means rotatably mounting the motor and gear housing in the frame member, a tool arbor journaled in the gear housing to one side of the center thereof whereby rotation of the motor and gear housings in the frame member adjusts the tool arbor, a drive connection between the tool arbor and motor, a lever extended from one of the gear housings for convenience in rotating the housings to adjust the tool arbor shaft, and means releasably securing the motor and gear housings in the frame member against rotation.

3. In a tool of the character described, a frame including side and end members, a drive motor, a gear housing forming a substantial continuation of the drive motor housing and detachably secured thereto, means rotatably mounting the motor and gear housing in the frame between the end members, a tool arbor journaled in the gear housing to one side of the center thereof whereby rotation of the housings varies the position of the tool arbor with respect to the work engaging face of the frame, means for readily releasably securing the motor and gear housing against rotation in the frame, and means for limiting the rotation of the motor and gear housing in either direction.

4. In a tool of the character described, a frame member including a base plate provided at one end with a bearing and at the other end with a vertically disposed standard, said standard having an enlarged horizontal bore therein, a drive motor, a journal on the outer end of the motor and journaled in the frame member bearing, a gear housing extended from the inner end of the motor housing and forming a continuation thereof, said gear housing having its outer end portion journaled in the bore of the standard whereby the motor and gear housings may be jointly rotated in the frame member, a tool arbor extended from the gear housing beyond the standard and offset with respect to the center of the gear housing whereby rotation of the gear housing adjusts the tool arbor with relation to the work engaging face of the frame member, a drive connection between said tool arbor and drive motor, and means for readily releasably securing the motor and gear housing against rotation.

5. In a tool of the character described, a frame member including a base plate provided at one end with a bearing and at the other end with a vertically disposed standard, said standard having an enlarged horizontal bore therein, a drive motor, a journal on the outer end of the motor and journaled in the frame member bearing, a gear housing extended from the inner end of the motor and forming a continuation of the drive motor housing, said gear housing having its outer end portion journaled in the bore of the standard whereby the motor and gear housing may be jointly rotated in the frame member, a tool arbor extended from the gear housing beyond the standard and offset with respect to the center of the gear housing whereby rotation of the gear housing adjusts the tool arbor with relation to the work engaging face of the frame member, a drive connection between the tool arbor and the drive motor, said standard having an elongated slot therein communicating with its bore, and friction means passing through said slot and engageable with the gear housing to readily releasably secure the same against rotation.

6. A tool of the character described, comprising a frame, a vertically extended standard at one end of the frame and having a bore and an elongated slot communicating with the bore, a driving element mounted on the frame and journaled in said bore, a radially disposed stud carried by the driving element and extended through said slot thereby preventing longitudinal shifting but permitting limited rotation of the driving element, a tool arbor carried by the driving element and offset with respect to the center thereof, and friction means threaded on the stud to readily releasably secure the driving element against rotation.

In testimony whereof I affix my signature.

WILLIAM P. CASEY.